(12) United States Patent
Borelli et al.

(10) Patent No.: US 6,632,759 B2
(45) Date of Patent: *Oct. 14, 2003

(54) UV PHOTOSENSITIVE MELTED GERMANO-SILICATE GLASSES

(75) Inventors: Nicholas F. Borelli, Elmira, NY (US); George B. Hares, Corning, NY (US); Charlene M. Smith, Corning, NY (US)

(73) Assignee: Corning Incorporated, Corning, NY (US)

(*) Notice: Subject to any disclaimer, the term of this patent is extended or adjusted under 35 U.S.C. 154(b) by 205 days.

This patent is subject to a terminal disclaimer.

(21) Appl. No.: 09/874,342

(22) Filed: Jun. 5, 2001

(65) Prior Publication Data

US 2002/0033031 A1 Mar. 21, 2002

Related U.S. Application Data

(60) Provisional application No. 60/221,811, filed on Jul. 31, 2000, and provisional application No. 60/221,770, filed on Jul. 31, 2000.

(51) Int. Cl.[7] ................... C03C 3/091; C03C 3/064
(52) U.S. Cl. .................. 501/66; 501/37; 501/59; 501/77; 385/37; 385/141
(58) Field of Search ................ 501/37, 66, 59, 501/77; 385/37, 141; 359/34, 900

(56) References Cited

U.S. PATENT DOCUMENTS

| | | | |
|---|---|---|---|
| 2,059,640 A | 11/1936 | Hood | 176/122 |
| 2,069,713 A | 2/1937 | Braselton | 250/35 |
| 2,382,056 A | 8/1945 | Hood | 106/54 |
| 4,094,689 A | 6/1978 | van Ass et al. | 106/50 |
| 4,097,258 A | 6/1978 | Horikawa et al. | 65/31 |
| 4,390,638 A | 6/1983 | Mennemann et al. | 501/77 |
| 5,136,677 A | 8/1992 | Drexhage et al. | 385/123 |
| 5,327,515 A | 7/1994 | Anderson et al. | 385/123 |
| 5,367,588 A | 11/1994 | Hill et al. | 385/37 |
| 5,495,548 A | 2/1996 | Bilodeau et al. | 385/123 |
| 6,075,625 A | 6/2000 | Ainslie et al. | 359/3 |
| 6,229,945 B1 | 5/2001 | Ainslie et al. | 385/123 |
| 6,271,160 B1 | 8/2001 | Yamamotot et al. | 501/42 |
| 6,510,264 B2 * | 1/2003 | Bhagavatula et al. | 385/37 |

FOREIGN PATENT DOCUMENTS

| | | |
|---|---|---|
| CA | 354533 | 4/1935 |
| GB | 263410 | 12/1926 |
| GB | 298908 | 1/1930 |
| GB | 319337 | 2/1930 |

OTHER PUBLICATIONS

"Optical and Physical Properties of UV–Transmitting Fluorocrown Glasses," Liepmann et al., *Proceedings of the SPIE, Glasses for Optoelectronics*, vol. 1128, 1989, p. 213–224.
Glass Color Filters, Corning Glass Works, Optical Sales Dept., Corning, NY, 1948, pp 1–22.
Glass Color Filters, Corning Glass Works, Price List, Optical Sales Dept., Corning, NY, May 1, 1954, pp. 1–3.
New Ultra–violet Transmitting Glass, H.P. Hood, Science 64, 281–282, 1926.

* cited by examiner

*Primary Examiner*—Karl Group
(74) *Attorney, Agent, or Firm*—Edward F. Murphy; James V. Suggs

(57) ABSTRACT

The present invention relates generally to UV (ultraviolet) photosensitive bulk glass, and particularly to batch meltable alkali boro-alumino-silicate glasses. The photosensitive bulk glass of the invention exhibits photosensitivity to UV wavelengths below 250 nm.

The photosensitivity of the alkali boro-alumino-silicate bulk glass to UV wavelengths below 250 nm provide for the making of refractive index patterns in the glass. With a radiation source below 250 nm, such as a laser, refractive index patterns are formed in the glass. The inventive photosensitive optical refractive index pattern forming bulk glass allows for the formation of patterns in glass and devices which utilize such patterned glass.

65 Claims, 10 Drawing Sheets

UV PHOTOSENSITIVE MELTED GERMANO-SILICATE GLASSES

CROSS-REFERENCE TO RELATED PATENT APPLICATIONS

This application claims the benefit of U.S. Provisional Application, Serial No. 60/221,811, filed Jul. 31, 2000, entitled UV Photosensitive Melted Germano-Silicate Glass, by Nicholas F. Borrelli, George B. Hares and Charlene M. Smith.

This application is related to co-filed U.S. Application Serial No. 60/221,770, filed Jul. 31, 2000, entitled Bulk Internal Bragg Gratings and Optical Devices, of V. A. Bhagavatula et al., which is hereby incorporated by reference.

BACKGROUND OF THE INVENTION

The present invention relates generally to UV (ultraviolet) photosensitive bulk glass, and particularly to batch meltable alkali boro-alumino-silicate glasses. The photosensitive bulk glass of the invention exhibits photosensitivity to UV wavelengths below 250 nm.

The photosensitivity of the alkali boro-alumino-silicate bulk glass to UV wavelengths below 250 nm provides for the making of refractive index patterns in the glass. With a radiation source below 250 nm, such as a laser, refractive index patterns are formed in the glass. The inventive photosensitive optical refractive index pattern forming bulk glass allows for the formation of patterns in glass and devices which utilize such patterned glass.

In a particular embodiment the photosensitivity of the inventive bulk glass is utilized to make Bragg gratings in the glass. As described in the U.S. Patent Application Serial No. 60/221,770, filed Jul. 31, 2000, Bulk Internal Bragg Gratings and Optical Devices, the inventive photosensitive bulk glass is particularly suited for the making of photonic devices utilized in optical telecommunications.

SUMMARY OF THE INVENTION

The invention includes a photosensitive glass. The starting glass is a photosensitizable alkali boro-alumino-silicate glass that can be loaded with hydrogen to make it photosensitive. Preferably the glass is a below 250 nm photosensitive glass which has a composition of 40–80 mole % $SiO_2$, 2–15 mole % $GeO_2$, 10–36 mole % $B_2O_3$, 1–6 mole % $Al_2O_3$ and 2–10 mole % $R_2O$ where R is chosen from the alkali elements with the glass exhibiting photosensitivity to below 250 nm wavelengths.

The invention further includes a molecular hydrogen loadable photosensitive bulk glass. The photosensitive bulk glass is an alkali boro-alumino silicate glass with a melting temperature no greater than 1650° C. Preferably the glass has a batch composition comprising no greater than 85 mole % $SiO_2$, no less than 10 mole % $B_2O_3$, no less than 2 mole % $GeO_2$, and a combined alkali and alumina content no greater than 20 mole % $Al_2O_3$+Alkali with the glass having a molecular hydrogen loadable level of at least $10^{18}$ $H_2$ molecules/cm$^3$.

The invention further includes a method of making a refractive index pattern. The invention includes providing a photosensitive bulk glass having a 250 nm absorption less than 20 dB/cm, providing a radiation source below 250 nm, forming a pattern with the below 250 nm radiation, and exposing the photosensitive bulk glass to the pattern to form a modulated refractive index pattern in the bulk glass.

The invention further includes a method of making a molecular hydrogen loadable photosensitive glass optical device preform. Preferably the method comprises making a refractive index pattern preform out of melted glass. The method includes providing a germania silica glass powder batch with a transition metal contamination level≦1 ppm by weight for transition metals and a heavy metal contamination level≦1 ppm by weight for heavy metals. The method includes melting the silica glass powder batch to form a homogeneous glass melt, cooling the glass melt into a UV transmitting bulk glass having a 250 nm absorption less than 20 dB/cm and forming the bulk glass into an optical device preform in which refractive index patterns can be made.

The invention further includes a photosensitive glass optical refractive index pattern preform for use with UV light in the formation of refractive index patterns. The preform is comprised of an Alkali boro-alumino-silicate glass with a 250 nm absorption less than 20 dB/cm. The preform glass has a UV wavelength inducable modulated refractive index Δn level>$10^{-5}$ with a molecular hydrogen level of at least $10^{18}$ $H_2$ molecules/cm$^3$.

BRIEF DESCRIPTION OF THE DRAWINGS

FIG. 4 inset is a plot of absorbance versus wave numbers (cm$^{-1}$) showing OH stretching vibrations and absorbance before (dashed line) and after (solid line) a 90 minute UV exposure of 20 mJ/cm$^2$/pulse.

FIG. 6 inset show the geometry of the UV exposure and the reflectivity and transmission measurements of the plot.

DETAILED DESCRIPTION OF THE PREFERRED EMBODIMENTS

Figure 1:
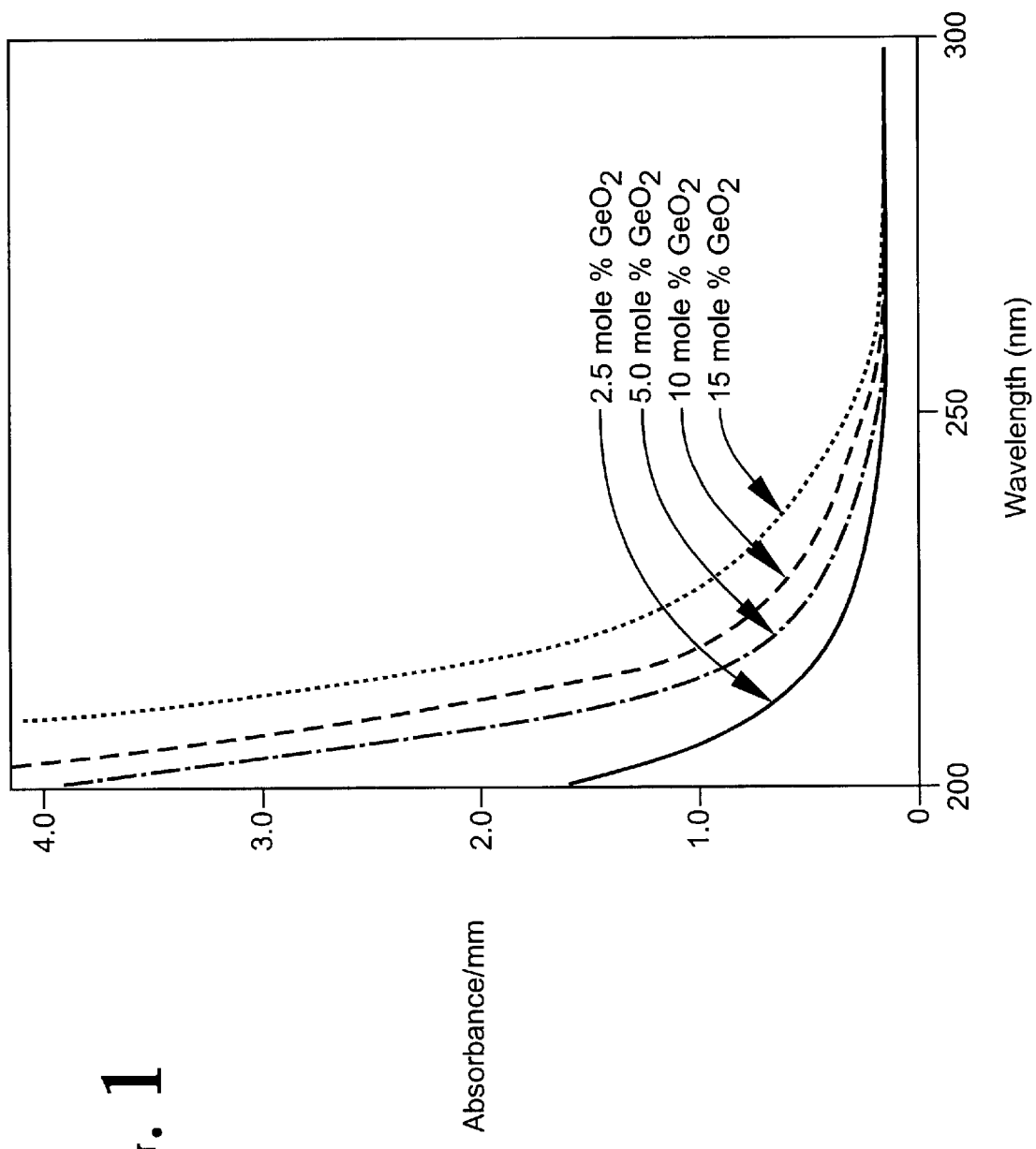
FIG. 1 is a plot of absorbance/nm versus UV wavelength (nm) (200–300 nm) in accordance with the invention.

The invention comprises a below 250 nm UV light photosensitizable glass with 40–80% $SiO_2$, 2–15 mole % $GeO_2$, 10–36 mole % $B_2O_3$, 1–6 mole % $Al_2O_3$ and 2–10 mole % $R_2O$ wherein R is an alkali, with the glass photosensitive when loaded with hydrogen. Preferably the glass comprises 42–73 mole % $SiO_2$, 2–15% mole % $GeO_2$, 25–36 mole % $B_2O_3$, 2–6 mole % $Al_2O3$, and 2–6 mole % $R_2O$. More preferably the glass comprises 42–67 mole % $SiO_2$, 2–15 mole % $GeO_2$, 25–36 mole % $B_2O_3$, 2–6 mole % $R_2O$. Preferably $R_2O$ is at least one Alkali oxide chosen from the group of Na, Li, and K. In an embodiment R is Na. In another embodiment R is Li. In a further embodiment R is K. In embodiments of the invention the R Alkali content of the glass includes mixtures of Na, Li, and K. Preferably the glass has an alkali-alumina ratio in the range of 1±0.5. Preferably the glass is essentially free of non-bridging oxygen ions and such are minimized and inhibited by the glass components.

The photosensitizable glass has a loadable hydrogen content $\geq 10^{18}$ $H_2$ molecules/cm$^3$ and preferably is loaded with at least $10^{18}$ $H_2$ molecules. More preferably the glass has a loadable hydrogen content $\geq 10^{19}$ $H_2$ molecules/cm$^3$ and preferably is loaded with at least $10^{19}$ $H_2$ molecules for improved photosensitivity. More preferably the glass is loadable and loaded with at least $2\times 10^{19}$, and more preferred at least $3\times 10^{19}$ hydrogen molecules per cm$^3$. Such hydrogen load levels are preferably achieved with a hydrogen loading temperature no greater than 200° C. with the molecular hydrogen entering the glass as molecular hydrogen ($H_2$) and remaining as molecular hydrogen in the glass in that the hydrogen molecules contained in the glass do not disassociate and react with the glass until irradiated.

The photosensitizable glass has a transition metal contaminant level $\leq 1$ ppm by weight for transition metal contaminants. The glass also has a heavy metal contaminant level $\leq 1$ ppm by weight for heavy metal contaminants. Preferably the glass has a Fe content <1 ppm by weight Fe, and more preferably <0.1 ppm by weight Fe. Preferably the glass has a Ti content <1 ppm by weight Ti, and more preferably <0.1 ppm by weight Ti. The photosensitizable glass has a 250 nm absorption less than 30 dB/cm, preferably less than 20 dB/cm, and more preferably less than 15 dB/cm. Even more preferred the 250 nm absorption is <10 dB/cm and most preferably <5 dB/cm.

Preferably the photosensitizable glass is a melted glass, and most preferably a non-sintered glass. The glass has a melting temperature $\leq 1650°$ C., and preferably $\leq 1600°$ C. which provides for formation by melting a mixed batch of glass feedstock powders to form a homogeneous glass melt which can be cooled into the glass. Preferably the glass has a melting temperature $\leq 1550°$ C., and more preferably $\leq 1500°$ C. Preferably the glass has a softening temperature $\leq 700°$ C. Such glass forming temperatures allow for efficient and economic manufacturing of the glass and avoid the complications of sintering and sintered glass compositions.

Preferably the glass has a below 250 nm wavelength induced modulated refractive index $\Delta n > 10^{-5}$ where the exposure wavelength is no greater than 250 nm and the glass is loaded with a molecular hydrogen content>$10^{18}$ $H_2$ molecules/cm$^3$. The inventive glass exhibits photosensitivity as a consequence of exposure to light of no greater than 250 nm wavelength, preferably with a below 250 nm wavelength induced modulated refractive index $\Delta n > 10^{-4}$ when loaded with a molecular hydrogen content>$10^{19}$ $H_2$ molecules/cm$^3$. Preferably the glass has a modulated refractive index $\Delta n > 2^{-4}$ when hydrogen loaded.

The invention further includes a molecular hydrogen loadable photosensitive bulk glass comprised of an alkali boro-alumino-silicate glass with a melting temperature $\leq 1650°$ C. Preferably the alkali boro-alumino-silicate glass has a batch composition of $\leq 85$ mole % $SiO_2$, $\geq 10$ mole % $B_2O_3$, $\geq 2$ mole % $GeO_2$, and a combined Alkali and alumina content<20 mole % $Al_2O_3$+Alkali. Preferably the glass has a molecular hydrogen loadable level of at least $10^{18}$ $H_2$ molecules/cm$^3$, and more preferably at least $10^{19}$ $H_2$ molecules/cm$^3$. More preferably the molecular hydrogen loadable level $\geq 2\times 10^{19}$ $H_2$ molecules/cm$^3$, and most preferred $\geq 3\times 10^{19}$ $H_2$ molecules/cm$^3$. Preferably the batch composition is $\leq 80$ mole % $SiO_2$ and $\geq 20$ mole % $B_2O_3$. More preferably the batch composition has $\leq 70$ mole % $SiO_2$ and $\geq 25$ mole % $B_2O_3$. Preferably the glass has a batch composition with a combined Alkali and alumina content>16 mole % $Al_2O_3$+Alkali.

Preferably the photosensitive bulk glass is essentially free of transition metals and with a 250 nm absorption less than 30 dB/cm. Preferably, the transition metal contaminant levels are below 1 ppm by weight, with the iron content<1 ppm by weight and more preferably <0.1 ppm by weight. Preferably the titanium content is <1 ppm by weight, and more preferably <0.1 ppm. Preferably the bulk glass has a 250 nm absorption<20 dB/cm, more preferably <15 dB/cm, more preferably <10 dB/cm, and most preferred <5 dB/cm.

The glass has a refractive index photosensitivity level modulated $\Delta n > 10-5$ with a loaded molecular hydrogen content $\geq 10^{18}$ $H_2$ molecules/cm$^3$. Such a $\Delta n$ can be achieved with a 248 nm KrF excimer laser UV exposure of 90 minutes at 12 mJ/cm$^2$/pulse. Preferably the glass has a refractive index photosensitivity level $\Delta n > 10--4$ with a loaded molecular hydrogen content>$10^{19}$ $H_2$ molecules/cm$^3$. Preferably the bulk glass is loadable with molecular hydrogen to a molecular hydrogen loaded level of at least $10^{19}$ $H_2$ molecules/cm$^3$ with a hydrogen loading temperature $\leq 200°$ C. Preferably the glass has a molecular hydrogen content >$10^{19}$ $H_2$ molecules/cm$^3$ and a below 250 nm wavelength induced modulated refractive index $\Delta n > 10^{-4}$.

Preferably the bulk glass Alkali boro-alumino-silicate glass batch composition has a $SiO_2$ content $\leq 65$ mole % $SiO_2$, and more preferably <60 mole % $SiO_2$. Preferably the bulk glass batch composition has a $GeO_2$ content $\geq 10$ mole % $GeO_2$, more preferably $\geq 15$ mole % $GeO_2$, and most preferred $\geq 20$ mole % $GeO_2$. Preferably the bulk glass batch composition has a combined Alkali and alumina content $\leq 13$ mole % $Al_2O_3$+Alkali, more preferably $\leq 10$ mole % $Al_2O_3$+Alkali, and most preferred $\leq 5$ mole % $Al_2O_3$+Alkali. In a preferred embodiment the Alkali comprises Na. In a further embodiment the Alkali comprises Li. In another embodiment the Alkali includes K. Preferably the bulk glass composition has an $Al_2O_3$ content $\leq 6$ mole % $Al_2O_3$. Preferably the bulk glass composition has a $NaO_2$ content $\leq 6$ mole % $Na_2O$. Preferably the bulk glass has a $B_2O_3$ content $\geq 30$ mole % $B_2O_3$. Preferably the glass has an increased OH content (such as shown by OH streeching vibration spectra) when loaded with molecular hydrogen and exposed to UV radiation, preferably with the glass having an OH range of about 100 to 1000 OH ppm by weight. Preferably the glass has a chlorine content less than 10 ppm by weight and more preferred <5ppm, and most preferred <1 ppm.

The bulk glass is a non-sintered glass, and preferably has a melting temperature $\leq 1600°$ C., and more preferred $\leq 1550°$ C. Preferably the glass is a cooled fluid melt mixture formed from a fluid melt, preferably with the fluid melt formed by melting glass batch feedstock powders. In a preferred embodiment the bulk glass is a homogeneous glass device preform body with a homogeneous composition with glass dopants evenly spread throughout the glass body. Preferably the preform body has a homogeneous index of refraction and is free of pre-radiated core and claddings regions with a homogeneous distribution of glass component elements.

The invention includes a method of making a refractive index pattern. Preferably the method comprises making a refractive index pattern grating. The method of making a pattern includes providing a photosensitive bulk glass having a 250 nm absorption less than 30 dB/cm, preferably less than 20 dB/cm. the method includes providing a below 250 nm radiation source and producing below 250 nm radiation. The method includes forming a pattern with the below 250 nm radiation and exposing the photosensitive bulk glass to the pattern to form a modulated refractive index pattern in the bulk glass. Preferably the provided bulk glass has a <15 dB/cm absorption at 250 nm, more preferably <10 dB/cm, and most preferably <5dB/cm. Forming the pattern preferably comprises forming a pattern and exposing the bulk glass to the pattern to form a modulated refractive index grating in the bulk glass.

Providing the photosensitive bulk glass preferably includes providing an alkali boro-alumino-silicate glass. The provided bulk glass body preferably is homogeneous in composition and refractive index and does not have separate core/cladding regions.

Providing the photosensitive bulk glass includes providing a non-sintered glass, with the glass being a melted glass. Preferably the glass is a melted glass with a melting temperature≦1650° C. More preferably the melting temperature of the bulk glass ≦1600° C., more preferred ≦1550° C., and most preferred ≦1500° C. Providing the photosensitive bulk glass includes providing an alkali boro-alumino-silicate glass batch and melting the glass batch to form an alkali boro-alumino-silicate glass melt. The method includes cooling the glass melt into the bulk glass. Preferably melting includes containing the glass melt in a heated glassy fluid state and forming the glass melt into a coolable body, such as delivering the glass melt through an orifice and to a cooling site.

The provided bulk glass is a molecular hydrogen loadable bulk glass. Preferably the method includes providing a melted bulk glass and loading the bulk glass with at least $10^{18}$ $H_2$ molecules/cm$^3$. Preferably loading the bulk glass includes loading with at least $10^{19}$ $H_2$ molecules/cm$^3$, and more preferably at least $2 \times 10^{19}$ $H_2$ molecules/cm$^3$. Loading the bulk glass is performed with a molecular hydrogen loading temperature<300° C. Preferably the hydrogen loading temperature≦250° C., more preferably ≦200° C., and most preferably ≦150° C. Preferably a hydrogen load atmosphere of at least 2 atmospheres of hydrogen are used, and most preferably at least 100 atmospheres of $H_2$ is utilized to dope the bulk glass. Such loading can be achieved in high temperature vessels that contain the $H_2$ gas and the bulk glass. Preferably the bulk glass body has a glass body physical size with glass volume and surface area to provide efficient loading of the hydrogen, preferably with the bulk glass body being a near net shape of the preform and optical device it is made into. The bulk glass is exposed to the $H_2$ gas pressurized atmosphere for a $H_2$ loading time sufficient and effective such that the center of the bulk glass body has a molecular hydrogen concentration that is at least 90% of the ambient $H_2$ loading atmosphere.

Exposing the photosensitive bulk glass preferably includes exposing the glass to form a pattern by inducing a refractive index $\Delta n \geq 10^{-5}$, and most preferably $\Delta n \geq 10^{-4}$.

The invention includes a method of making a molecular hydrogen loadable photosensitive glass optical device preform. The method of making the preform includes providing a germania silica glass batch with a transition metal contamination level≦1 ppm by weight for transition metals and a heavy metal contamination level≦1 ppm by weight for heavy metals. The method includes melting the silica glass batch to form a homogeneous glass melt, cooling the glass melt into a UV transmitting bulk glass having a 250 nm absorption less than 20 dB/cm and forming the bulk glass into an optical device preform.

Forming the bulk glass into an optical device preform preferably includes loading the bulk glass with molecular hydrogen to a level of at least $10^{18}$ $H_2$ molecules/cm$^3$, and more preferably at least $10^{19}$ $H_2$ molecules/cm$^3$.

Providing the germania silica glass batch includes providing an alkali boro-alumino-silicate glass batch and melting the glass batch at a melting temperature≦1650° C. Preferably melting comprises melting at ≦1600° C., more preferably ≦1550° C., and most preferably ≦1500° C. The method of making preferably includes pouring the glass melt to form bulk glass bodies, and more preferably includes delivering the glass melt through a glass forming orifice. Making the bulk glass preforms preferably includes forming a preform glass body bulk with a smallest size dimension that is greater than 5 μm.

The invention further includes a photosensitive glass optical refractive index pattern preform for use with UV light in the formation of refractive index patterns. The inventive preform is comprised of an alkali boro-alumino-silicate glass with a 250 nm absorption less than 20 dB/cm. The preform has a below 250 nm UV wavelength inducable modulated refractive index $\Delta n$ level>$10^{-5}$ with the bulk glass exhibiting photosensitivity as a consequence of exposure to light of 250 nm or less with a molecular hydrogen level of at least $10^{18}$$H_2$ molecules/cm$^3$. Preferably the refractive index pattern preform has a UV wavelength inducable modulated refractive index $\Delta n$ level>$10^{-4}$ with a molecular hydrogen level of at least $10^{19}$ $H_2$ molecules/cm$^3$. Preferably the bulk glass preform has a 250 nm absorption less than 15 dB/cm, more preferably less than 10 dB/cm, and most preferred less than 5 dB/cm. Preferably the alkali boro-alumino-silicate glass preform is a non-sintered glass body formed by a melting process to result in a melted glass.

EXAMPLES

The invention includes a large UV-induced refractive index change in a melted alkali-alumino-boro-germano-silicate composition that has been loaded with molecular hydrogen. The UV exposures utilized include CW 244-nm light and a pulsed KrF excimer laser at 248-nm. A modulated refractive index of the order of $2-3 \times 10^{-4}$ has been measured in the bulk glass.

It is believed that the ability to load with molecular hydrogen, and the photoreaction, depends on the composition of the glass. The UV spectroscopy of the bulk glass before and after exposure, as well as the magnitude of the induced refractive index correlates well with the growth of the OH absorption as measured in the IR (OH stretching vibrations).

Figure 6:
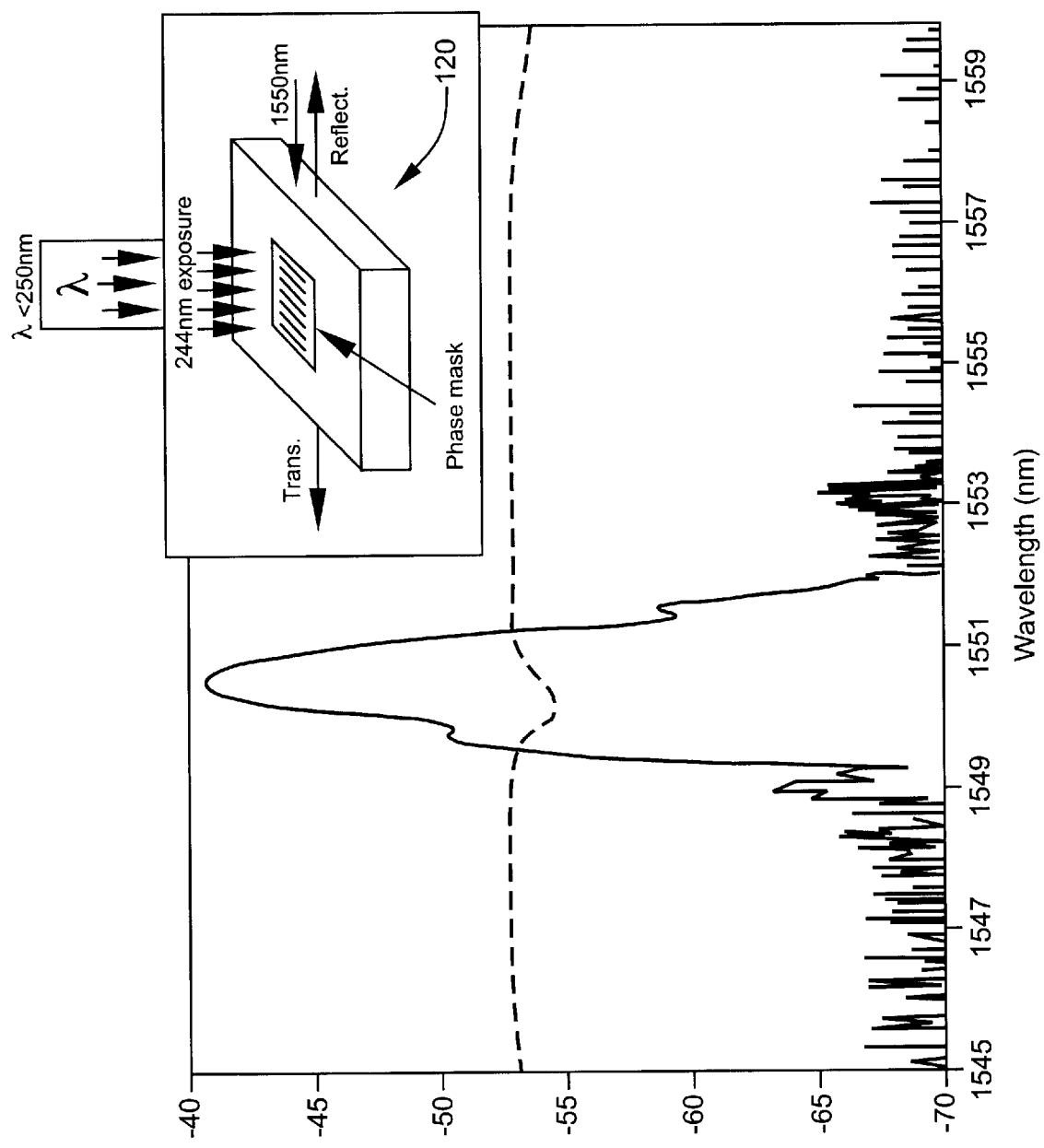
FIG. 6 is a plot of intensity (dBm) versus wavelength (1545 nm–1559 nm) of refractive index pattern grating formed in the bulk glass in accordance with the invention.

As shown in FIG. 6, a Bragg grating was made in a bulk glass sample (Glass 5 g, Glass Composition Table) by exposing through a phase mask from the top face, with a measured transmission and reflectivity as shown.

In order to provide melted glasses, the invention utilizes various constituents to make the glass softer and lower the melting temperature. This includes using constituents like alkali, alumina and boron to lower the melting temperature and to decrease the viscosity. In a preferred embodiment the glass batch melting temperature is lowered by using a sufficient amount of a fluoride of the glass components to lower the melting temperature. For example with Glass 4b (Glass Composition Table) aluminum fluoride is utilized with a F batch composition of about 3.3 wt. %. In a preferred embodiment the batch composition melting temperature is lowered with a batch composition incorporating of fluorine at a batch wt. % of $\leq 4$ wt. % F. The lowering of the melting temperature is done in such a way as not to move the fundamental absorption beyond 248-nm (5-eV).

The fundamental absorption edge of pure silica, for example, is determined by the transition from the band consisting of the overlapping 2p oxygen orbitals (valence band) to the band made up from the $sp^3$ non-bonding orbitals of the silicon (conduction band). The addition of alkali introduces another set of levels associated with the non-bridging oxygen. When the concentration is high enough, a new band appears above that of the original valence band, thus moving the fundamental absorption edge to longer wavelengths. On the other hand, the addition of the network substitution ions such as boron, aluminum, and germanium has much less influence on the absorption edge.

Impurities such as the transition metal ions or heavy metal ions that are inadvertently incorporated into the glass, either from the batch materials, the containment crucible, the furnace or forming, must be kept to the <1 ppm level. These ions, even in small amounts have a dramatic adverse effect on the UV-absorption edge.

The invention includes making a $SiO_2$—$GeO_2$ bulk glass that can be melted and formed in a conventional batch way by limiting the additional constituents sufficiently so as to maintain high transparency at 248-nm, and yet achieve melting at a reasonable temperature (1500° C.) and a softening temperature of approximately of 600° C. (softening temperature below 700° C. preferred).

Glasses were made from pure starting materials, in particular low iron content sand. They were melted in clean platinum crucibles at 1550° C. for 16 hours. In the initial sampling procedure, the glass was poured into patties and annealed. Subsequently, the quality of the glass was improved in terms of (striae) defects and cords by using semi-continuous melting where the glass is not poured from a melt crucible which is the source of much of the striae, but delivered through an orifice.

The hydrogen loading was done in a Parr™ pressurized reactor using 150° C. loading temperature at 100 atm pressure. The IR spectroscopy was done with a Nicolet™ FTIR spectrometer.

The effect on the absorption spectrum with change in GeO2 content for alkali-alumino-borosilicate glass family of $R_2O$ (3–4 mole %), $Al_2O_3$ (3–4 mole %), $B_2O_3$ (25–35 mole %), $GeO_2$ (2.5–15 mole %), and $SiO_2$ (66.5–42 mole %) is shown in FIG. 1. In all cases we were able to maintain high transmittance at a below 250 nm wavelength of 248-nm which was to be the UV exposure excitation wavelength.

We exposed samples from each system to pure hydrogen ambient at 100 atm at 150° C. in order to impregnate the samples with molecular hydrogen. The higher temperature was used to speed up the diffusion process for samples that were a few millimeters thick and yet not allow the thermal reaction to occur. We used IR spectroscopy to determine the molecular hydrogen content. Photosensitivity was achieved with the inventive glasses that had a loaded molecular hydrogen content. Hydrogen load levels up to $5 \times 10^{19}$ $H_2$ molecules/cc were obtained with the inventive glass.

In order to measure the UV-induced photosensitivity, we hydrogen loaded 0.5-mm thick bulk glass samples. We then exposed them through a chrome absorption mask with a 10 µm grating pitch. The UV exposure source was a KrF excimer laser operating at 248-nm. The peak fluence was from 20–60 $mJ/cm^2$/pulse at 50 Hz for periods of time running from 5–120 min.

After the UV exposure, the sample was illuminated by a spatially filtered He—Ne laser and the diffraction efficiency of the induced phase grating was measured from the ratio of the intensity of the $1^{st}$ to $0^{th}$ order. As long as the diffraction efficiency is relatively weak one can use the following simple formula for the efficiency.

$$Eff = \left(\frac{\pi \Delta n L}{\lambda}\right)^2$$

Here, $\Delta n$ is the modulated refractive index change ($n = n_0 + \Delta n \cos(2\pi z/\Lambda)$, L is the grating index and $\Lambda$ is the period of the index pattern.

Figure 2A:
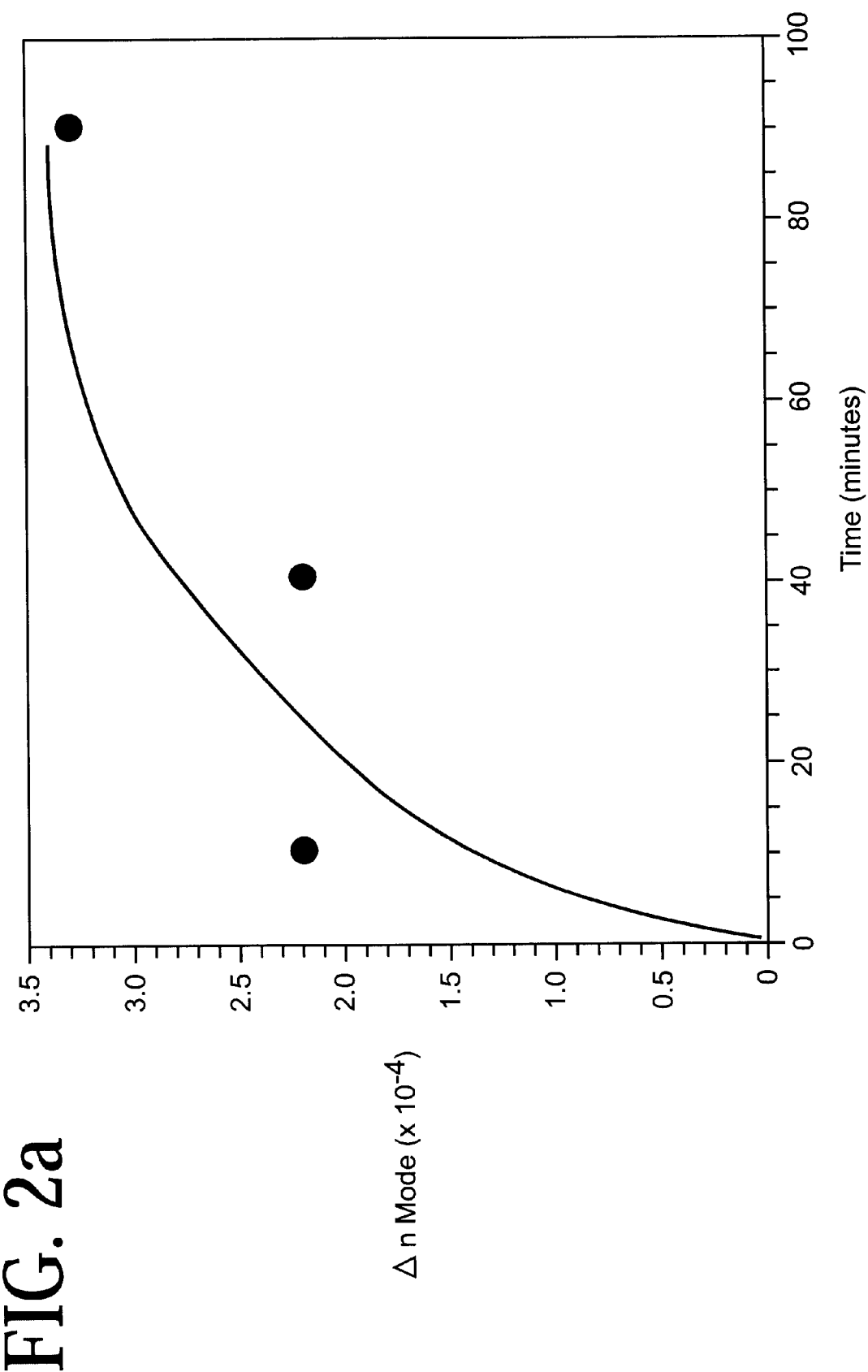
FIG. 2a is a plot of induced modulated refractive index [Δn (×$10^{-4}$)] versus UV exposure time (minutes) in accordance with the invention.
Figure 2B:
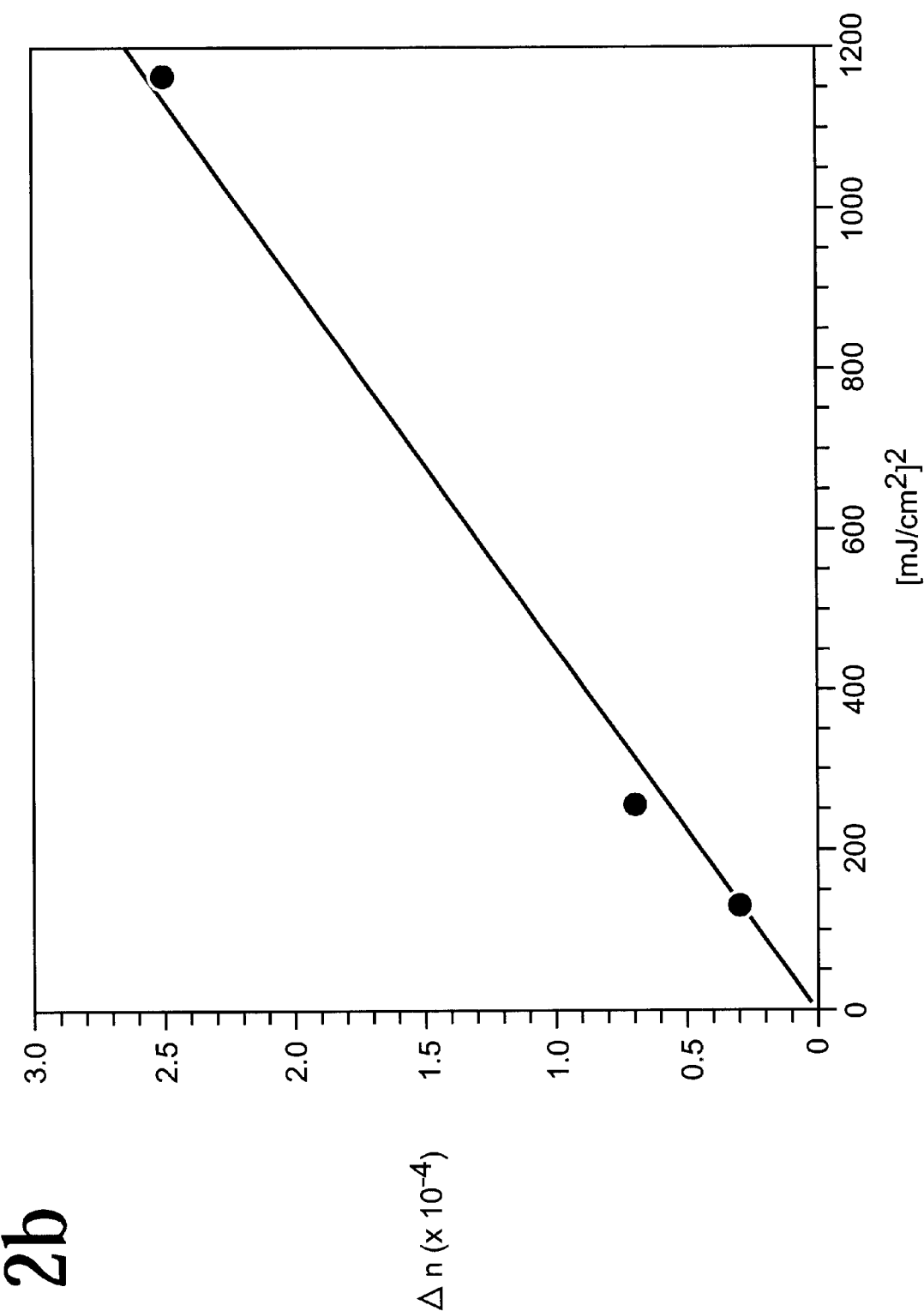
FIG. 2b is a plot of induced modulated refractive index [Δn (×$10^{-4}$)] versus UV exposure fluence [mJ/cm$^2$] in accordance with the invention.

The range of measured values of the induced refractive index after a fixed 248-nm UV exposure was from $1 \times 10^{31\ 4}$ to $3 \times 10^{-4}$ for the inventive alkali-alumino-borosilicate glasses. The induced modulated refractive index as a function of the exposure time at fixed fluence is shown in FIG. 2a. FIG. 2b shows the measured induced index as a function of fluence at fixed time. The latter is well represented by using the square of the fluence.

A set of glasses with fixed germania content was loaded with $H_2$ and UV exposed at 248-nm. The Glass Composition Table gives the composition, relative amounts of $H_2$ incorporated and the 248-nm excimer laser induced refractive index change for the set.

Figure 3:
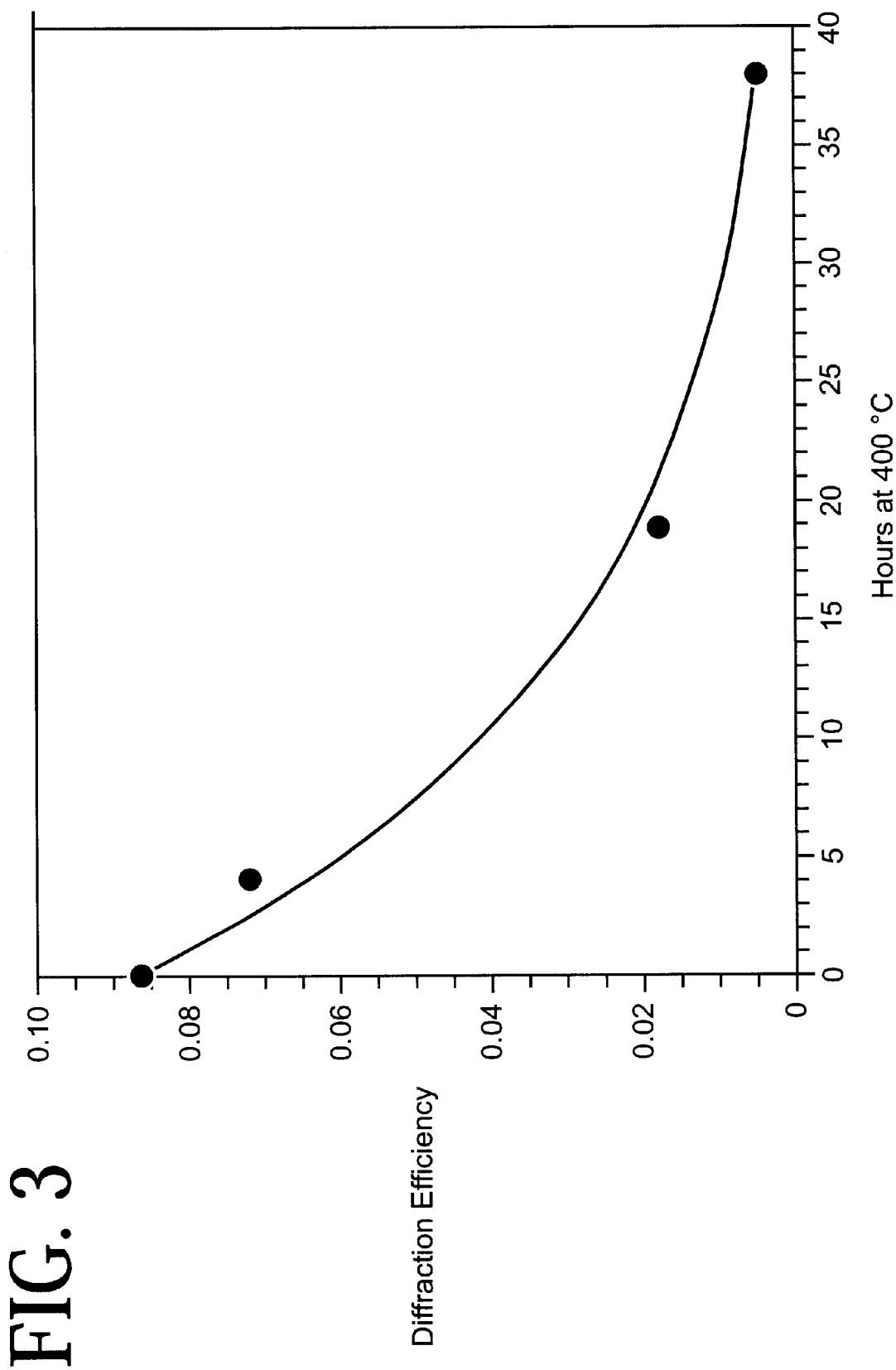
FIG. 3 is a photosensitivity thermal stability plot of diffraction efficiency of induced refractive index changes in the bulk glass versus Houvs heated at 400 C. in accordance with the invention.

The thermal stability of the induced refractive index change was investigated by heating a sample having a grating and re-measuring the grating efficiency with time at temperature. The change with time after heating to 400 degrees is shown in FIG. 3.

We have produced UV-induced refractive index changes in melted non-sintered bulk glasses, similar in magnitude to that seen in vapor deposition sintered flame or plasma prepared glasses, when a high concentration of molecular hydrogen can be obtained. This follows directly from our observation that preferred melted glasses where we see molecular $H_2(>10^{18}/cm^3$, as estimated by IR spectroscopy) we preferably obtain a measurable UV-induced refractive index change.

Figure 4:
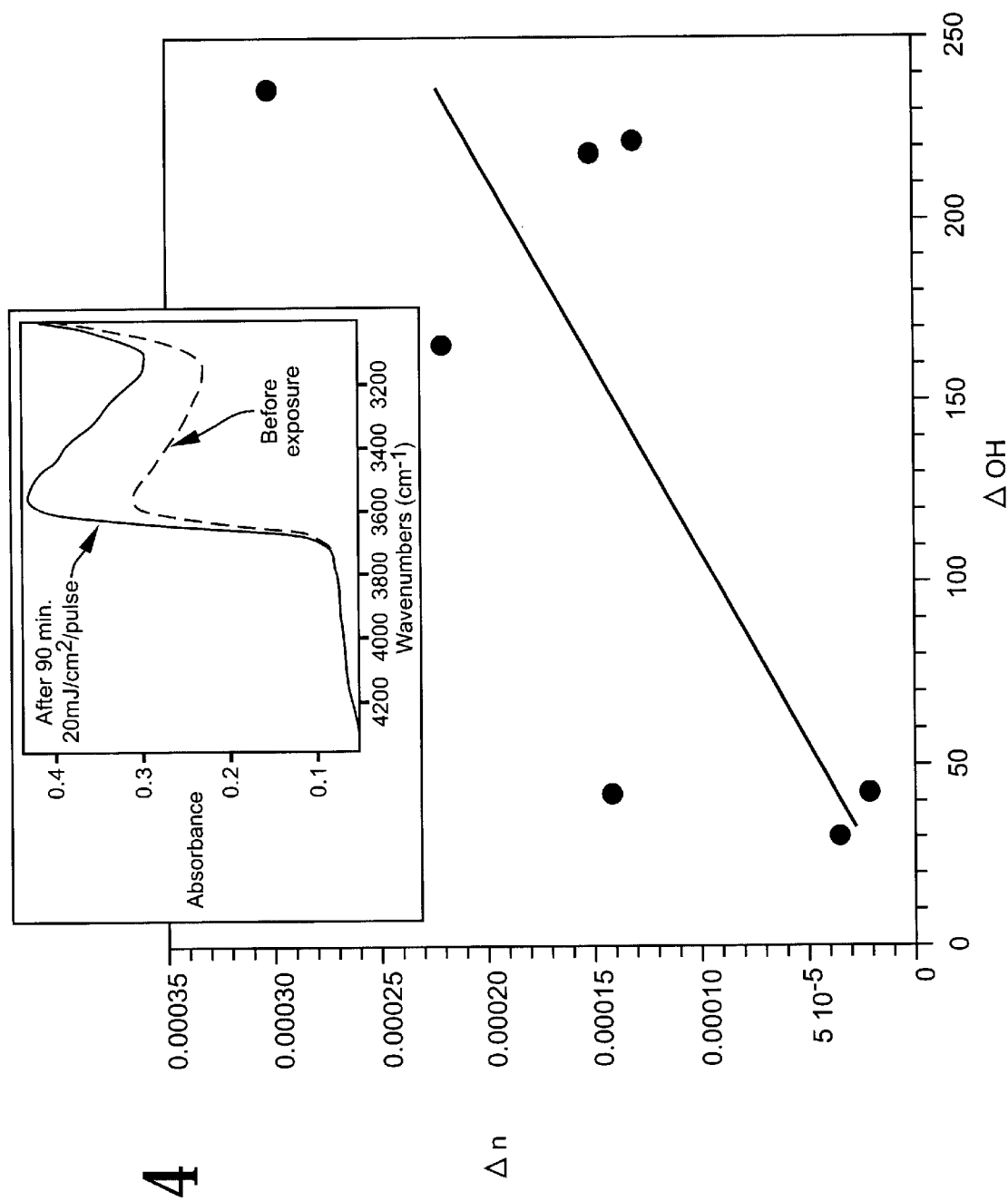
FIG. 4 is a plot induced refractive index [Δn] versus OH concentration in accordance with the invention.
Figure 5:
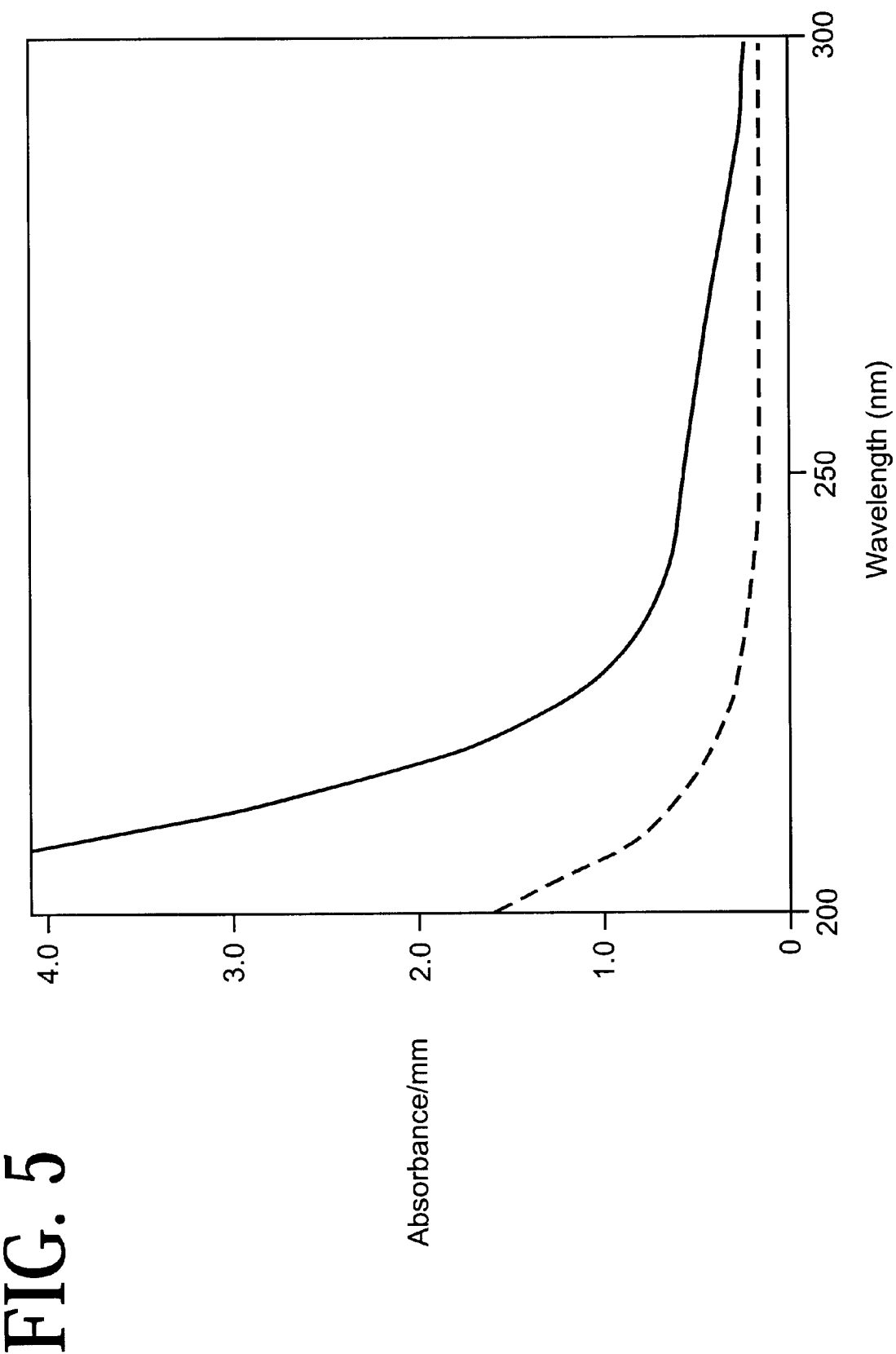
FIG. 5 is a plot of absorbance versus UV wavelength (nm) before (dashed line) and after (solid line) the 90 minute UV exposure of 20 mJ/cm$^2$/pulse of FIG. 4.

The mechanism for the molecular-mediated UV-induced photosensitivity seems to be consistent with that proposed for the hydrogen mediated effect found in the $SiO_2$—$GeO_2$ material prepared by methods other than melting such as vapor deposition and sintering. FIG. 4 shows the relationship of the increase in hydroxyl concentration (measured from the OH stretching vibration; see inset) with the induced refractive index also as shown in FIG. 5. There is also a large change in UV absorption after exposure.

We have observed stress that derives from the UV-exposure. This suggests that a volume change is occurring. From the sign of the birefringence we determine that the volume change corresponds to a densification. The refractive index contribution computed from this effect is small compared to the overall measured $\Delta n$.

Figure 7A:
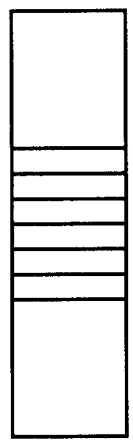
FIG. 7a is a cross-section showing the refractive index pattern grating in the bulk glass.
Figure 7:
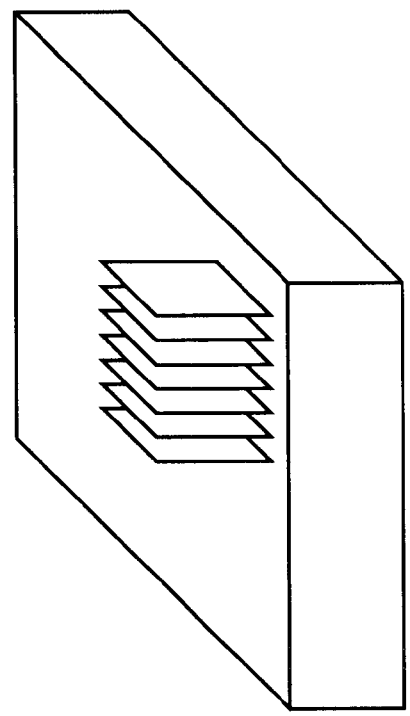
FIG. 7 illustrates the refractive index pattern grating of FIG. 6.

As shown in FIG. 6, a bulk glass sample of Glass 5 g of the Glass Composition Table (glass block of $5 \times 5 \times 3$ $mm^3$) was exposed through the wide face using a 244-nm CW laser (0.35W for preferred UV exposure time of 30–60 minutes) utilizing a phase mask with a period such as to satisfy the Bragg condition at 1550-nm to produce a refractive index pattern. The grating length was 2.5-mm. The reflectivity and transmission of the grating is shown in FIG. 6. The inset shows the geometry of the exposure and the reflectivity and transmission measurement. From the grating transmission measurement (1.5–2 db decrease corresponding to 30–40% reflectivity in the 2.5-mm long grating), a modulated refractive index change of $0.12$–$0.14 \times 10^{-3}$ is calculated at 1550-nm. FIG. 7 shows the refractive index pattern grating formed in the bulk glass preform glass block. FIG. 7a is a cross section showing the refractive index pattern grating in the bulk glass preform glass block.

Figure 9:
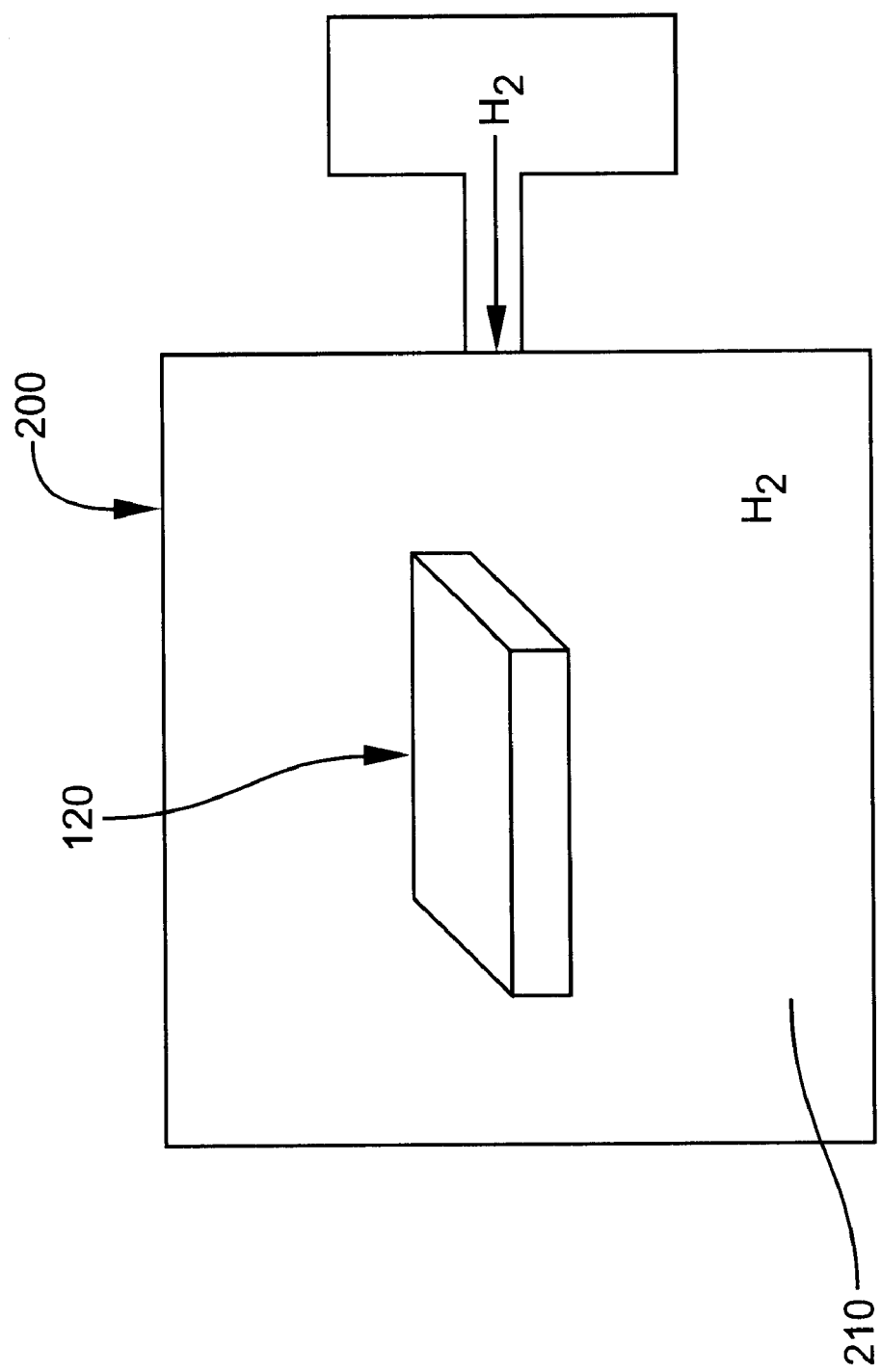
FIG. 9 illustrates a method in accordance with the invention.

$10.16 \times 10.16$ cm) and annealed at 414° C. The annealed bulk glass bodies 110 were cut, finished, and polished to provide smaller bulk glass bodies 120 having a rectangular block shape. Bulk glass bodies 120 had a dimension of $5 \times 5 \times 3$ mm$^3$. As shown in FIG. 9, bulk glass bodies 120 were loaded with molecular hydrogen ($H_2$) in a hydrogen pressure vessel 200 using a hydrogen atmosphere 210 of about 100 atmospheres to provide $H_2$ loaded bulk glass body preforms 120.

It will be apparent to those skilled in the art that various modifications and variations can be made to the present invention without departing from the spirit and scope of the

Glass Composition Table

| Mole % | 1 | 2 | 3 | 4b | 5g | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 62.5 | 57.5 | 47.5 | 43.4 | 51.6 | 56.6 | 54.1 | 62.8 | 61.6 | 54.0 | 56.6 | 56.6 | 54.0 | 51 | 66.2 | 75.7 | 78.5 |
| $GeO_2$ | 2.5 | 2.5 | 2.5 | 15.0 | 7.5 | 2.5 | 5 | 62.5 | 7.5 | 2.5 | 2.5 | 2.5 | 2.5 | 7.5 | 5 | 5 | 5 |
| $LiO_2$ | | | | 3.20 | 2.6 | 2.6 | 2.6 | 2.6 | 2.6 | 2.6 | | | 5.2 | 3.2 | 1.7 | .1 | |
| $Na_2O$ | 2.5 | 5 | 10 | | | | | | | | 2.6 | | | | .5 | 4.8 | 4.0 |
| $K_2O$ | | | | | | | | | | | | 2.6 | | | 7 | | |
| $Al_2O_3$ | 2.5 | 5 | 10 | 3.20 | 3.20 | 3.20 | 3.2 | 3.2 | 3.2 | 3.2 | 3.2 | 3.2 | 3.2 | 3.2 | 2.1 | 1.2 | 1.4 |
| $B_2O_3$ | 30 | 30 | 30 | 35.1 | 35.1 | 35.1 | 35.1 | 25.1 | 25.1 | 35.1 | 35.1 | 35.1 | 35.1 | 35 | 17.5 | 13.2 | 11.1 |
| $H_2$ ($\times 10^{19}$) | 5 | 3.7 | 0.26 | 5 | 5 | | | | | | | | | | 2.5 | 2.5 | 2.5 |
| $\Delta n$ (mod., $\times 10^{-4}$) | 2.8 | 1.3 | 0.15 | 2.1 | 1.2–2.2 | 0.5 | 1 | 1.1 | 2 | 2.1 | 1.6 | 0.73 | 0.3 | 1.3 | 0.3 | 0.2 | 0.1 |

Figure 8:
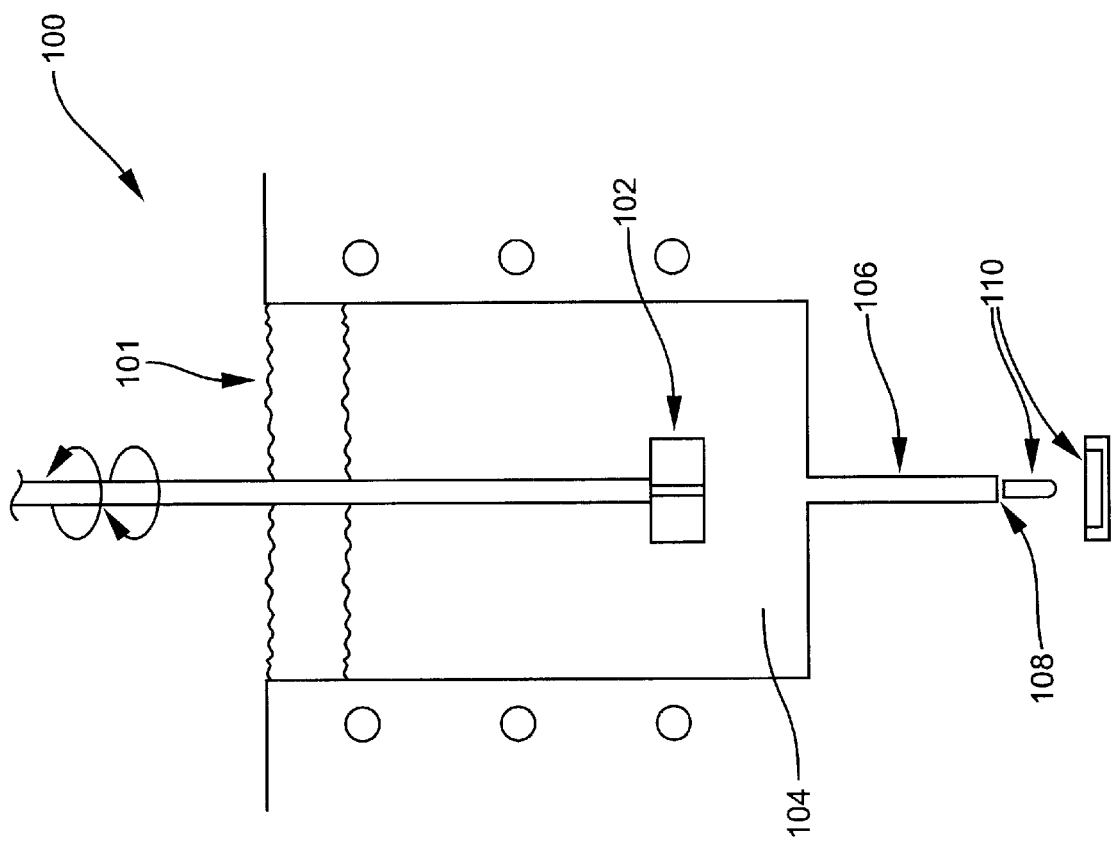
FIG. 8 illustrates a method in accordance with the invention.

Glass 4b of the Composition Table is the preferred composition of the invention. The weight percent batch composition was 35.8 wt. % $SiO_2$, 21.5 wt. % $GeO_2$, 4.48 wt. %, $Al_2O_3$, 3.38 wt. % F, 1.31 wt. % $Li_2O$, and 33.5 wt. % $B_2O_3$. The batch material powders were ball milled to provide a homogeneous batch mix. For $SiO_2$, high purity silica sand powder, such as IOTA-6 brand $SiO_2$ from the Unimin Corporation, Spruce Pine, N.C. 28777, was utilized with the high purity silica sand having a Fe impurity level of less than 0.1 ppm. For $GeO_2$, high purity germanium dioxide powder, such as Chemical Grade No. 1-29/99.999% purity $GeO_2$ from the Electro-Optic Materials Dept., Eagle-Picher Technologies, LLC, Quapaw, Okal. 74363, was utilized with a purity having 0.1 % maximum chloride content, $\leq 1$ ppm Fe, $\leq 1$ ppm Mg, $\leq 0.5$ ppm Ni, and no detectable Pb (1 ppm detect limit), and no Zn (10 ppm detect limit). For aluminum, high purity aluminum oxide powder, such as Gamma brand aluminum oxide 99.999% from Alfa Aesar, A Johnson Mathey Company, Ward Hill, Mass. 01835, was utilized with the 99.999% purity. For aluminum, high purity aluminum fluoride was also used, such as Alufluor brand aluminum fluoride from LidoChem, Hazlet, N.J. 07730. For lithium, lithium carbonate was used, such as the Tech Grade 99+% purity $Li_2CO_3$ brand from FMC Corporation, Lithium Div., Gastonia, N.C. 28054, with a 99%+purity, with a $Fe_2O_3$ wt. $\leq 0.1$. Also for lithium, lithium nitrate crystal was used, such as available from VWR Scientific, Rochester, N.Y. 14603. For boron, boric oxide was used, such as Hi purity brand Anhydrous Boric Acid from Stetson Chemicals, Inc., 391 Exchange St., Buffalo, N.Y. 14204. The batch powder mixture after ball milling was loaded into a large vertically oriented platinum lined cylindrical furnace 100 as shown in FIG. 8. A total batch mass of 25 kg was used with furnace 100 in a semi-continuous run.

Batch powder mixture 101 was melted at 1550° C. Furnace 100 includes a stirrer 102 for stirring glass melt 104 to provide a homogeneous glass melt. Furnace 100 includes a down corner 106 and a down corner orifice 108 for delivering a bulk glass body 110. Bulk glass bodies 110 were made with a general dimension of $1.5 \times 4 \times 4$ inches ($3.81 \times$ invention. Thus, it is intended that the present invention cover the modifications and variations of this invention provided they come within the scope of the appended claims and their equivalents.

What is claimed is:

1. A below 250 nm photosensitizable glass said photosensitizable glass comprising 40–80 mole % $SiO_2$, 2–15 mole % $GeO_2$, 10–36 mole % $B_2O_3$, 1–6 mole % $Al_2O_3$, and 2–10 mole % $R_2O$ wherein R is an alkali metal.

2. A glass as claimed in claim 1, said glass comprising 42–73 mole % $SiO_2$, 2–15 mole % $GeO_2$, 20–36 mole % $B_2O_3$, 2–6 mole % $Al_2O_3$, and 2–8 mole % $R_2O$.

3. A glass as claimed in claim 1, said glass comprising 42–67 mole % $SiO_2$, 2–15 mole % $GeO_2$, 25–36 mole % $B_2O_3$, 2–6 mole % $Al_2O_3$, and 2–6 mole % $R_2O$.

4. A glass as claimed in claim 1 wherein R comprises Na.

5. A glass as claimed in claim 1 wherein R comprises Li.

6. A glass as claimed in claim 1 wherein R comprises K.

7. A glass as claimed in claim 1 wherein R is at least one alkali metal chosen from a group consisting of Na, Li, K.

8. A glass as claimed in claim 1 having a loaded hydrogen content $\geq 10^{18}$ $H_2$ molecules/cm$^3$.

9. A glass as claimed in claim 1 having a loaded hydrogen content $\geq 10^{19}$ $H_2$ molecules/cm$^3$.

10. A glass as claimed in claim 1 having a transition metal contaminant level of $\leq 1$ ppm by weight for transition metal contaminants.

11. A glass as claimed in claim 1 having a heavy metal contaminant level of $\leq 1$ ppm by weight for heavy metal.

12. A glass as claimed in claim 1 having a Fe content<1 ppm by weight Fe.

13. A glass as claimed in claim 1 having a Ti content<1 ppm by weight Ti.

14. A glass as claimed in claim 1 having an absorption less than 20 dB/cm at a wavelength of 250 nm.

15. A glass as claimed in claim 8, said having a modulated refractive index $\Delta n \geq 2 \times 10^{-4}$.

16. A glass as claimed in claim 1, said glass being a non-sintered glass.

17. A glass as claimed in claim 1 having a melting temperature $\leq 1650°$ C.

18. A glass as claimed in claim 1 having a melting temperature≦1600° C.

19. A glass as claimed in claim 1 having a melting temperature≦1550° C.

20. A glass as claimed in claim 1 having a melting temperature≦1500° C.

21. A glass as claimed in claim 1 having softening temperature<700° C.

22. A glass as claimed in claim 1 wherein said glass has a alkali metal/alumina ratio in the range of 1±0.5.

23. A glass as claimed in claim 1 having a loadable hydrogen content≧$10^{18}$ $H_2$ molecules/$cm^3$.

24. A glass as claimed in claim 1 having a loadable hydrogen content≧$10^{19}$ $H_2$ molecules/$cm^3$.

25. A glass as claimed in claim 1 having a below 250 nm wavelength induced modulated refractive index Δn>$10^{-5}$ when loaded with a molecular hydrogen content>$10^{18}$ $H_2$ molecules/$cm^3$.

26. A glass as claimed in claim 1 having a below 250 nm wavelength induced modulated refractive index Δn>$10^{-4}$ when loaded with a molecular hydrogen content>$10^{19}$ $H_2$ molecules/$cm^3$.

27. A molecular hydrogen loadable photosensitive bulk glass, said glass comprised of an alkali metal boro-alumino-silicate glass having a melting temperature≦1650° C., said alkali metal boro-alumino-silicate glass having a batch composition comprising ≦85 mole % $SiO_2$, ≧10 mole % $B_2O_3$, ≧2 mole % $GeO_2$, and a combined alkali metal and alumina content <20 mole % $Al_2O_3$+alkali metal, said glass having a molecular hydrogen loadable level of at least $10^{18}$ $H_2$ molecules/$cm^3$.

28. A glass as claimed in claim 27, having a batch composition with ≦80 mole % $SiO_2$ and ≧20 mole % $B_2O_3$.

29. A glass as claimed in claim 27, having a batch composition with ≦70 mole % $SiO_2$ and ≧25 mole % $B_2O_3$.

30. A glass as claimed in claim 27, having a batch composition with a combined alkali metal and alumina content <16 mole % $Al_2O_3$+alkali metal.

31. A glass as claimed in claim 27, wherein said glass is essentially free of transition metals and has an absorption less than 30 dB/cm at a wavelength of 250 nm.

32. A glass as claimed in claim 27, wherein said glass has an iron content less than 1 ppm by weight.

33. A glass as claimed in claim 27, wherein said glass has a titanium content less than 1 ppm by weight.

34. A glass as claimed in claim 27, wherein said glass has an absorption less than 15 dB/cm at a wavelength of 250 nm.

35. A glass as claimed in claim 27, wherein said glass has an absorption less than 10 dB/cm at a wavelength of 250 nm.

36. A glass as claimed in claim 27, wherein said glass has an absorption less than 5 dB/cm at a wavelength of 250 nm.

37. A glass as claimed in claim 27, wherein said glass has a refractive index photosensitivity level modulated Δn>$10^{-5}$ with a loaded molecular hydrogen content≧$10^{18}$ $H_2$ molecules/$cm^3$.

38. A glass as claimed in claim 27, wherein said glass has a refractive index photosensitivity level Δn>$10^{-4}$ with a loaded molecular hydrogen content≧$10^{19}$ $H_2$ molecules/$cm^3$.

39. A glass as claimed in claim 27, wherein said glass is loadable with molecular hydrogen to a molecular hydrogen loaded level of at least $10^{19}$ $H_2$ molecules/$cm^3$ with a hydrogen loading temperature≦200° C.

40. A glass as claimed in claim 27 having a molecular hydrogen content>$10^{19}$ $H_2$ molecules/$cm^3$ and a below 250 nm wavelength induced modulated refractive index Δn>$10^{-4}$.

41. A glass as claimed in claim 27 having a $SiO_2$ content≦65 mole % $SiO_2$.

42. A glass as claimed in claim 27 having a $SiO_2$ content≦60 mole % $SiO_2$.

43. A glass as claimed in claim 27 having a $GeO_2$ content≧10 mole % $GeO_2$.

44. A glass as claimed in claim 27 having a $GeO_2$ content≧15 mole % $GeO_2$.

45. A glass as claimed in claim 27 having a $GeO_2$ content≧20 mole % $GeO_2$.

46. A glass as claimed in claim 27 having a combined alkali metal and alumina content≦13 mole % $Al_2O_3$+alkali metal.

47. A glass as claimed in claim 27 having a combined alkali metal and alumina content≦10 mole % $Al_2O_3$+alkali metal.

48. A glass as claimed in claim 27 having a combined alkali metal and alumina content≦5 mole % $Al_2O_3$+alkali metal.

49. A glass as claimed in claim 27 wherein said alkali metal comprises Na.

50. A glass as claimed in claim 27 wherein said alkali metal comprises Li.

51. A glass as claimed in claim 27 wherein said alkali metal comprises K.

52. A glass as claimed in claim 27 having a $Al_2O_3$ content≦6 mole % $Al_2O_3$.

53. A glass as claimed in claim 27 having a $NaO_2$ content≦6 mole % $Na_2O$.

54. A glass as claimed in claim 27 having a $B_2O_3$ content≧30 mole % $B_2O_3$.

55. A glass as claimed in claim 27 said bulk glass comprising a homogeneous glass device preform body having a homogeneous composition with glass dopants evenly spread throughout the glass body.

56. A glass as claimed in claim 27 said glass having an increased OH content when loaded with molecular hydrogen and exposed to UV radiation.

57. A glass as claimed in claim 27 said glass having an OH range of about 100 to 1000 OH ppm weight.

58. A glass as claimed in claim 27 said glass having a chlorine content less than 10 ppm by weight.

59. A glass as claimed in claim 27 said glass having a melting temperature≦1600° C.

60. A glass as claimed in claim 27 said glass having a melting temperature≦1550° C.

61. A glass as claimed in claim 27 said glass being formed by cooling a fluid melt mixture.

62. A glass as claimed in claim 27, wherein said glass is a non-sintered glass.

63. A photosensitive glass optical refractive index pattern preform for use with UV light in the formation of refractive index patterns, said preform comprised of an alkali metal boro-alumino-silicate glass with an absorption less than 20 dB/cm at a wavelength of 250 nm, said refractive index pattern preform having a UV wavelength inducable modulated refractive index Δn level>$10^{-5}$ with a molecular hydrogen level of at least $10^{18}$ $H_2$ molecules/$cm^3$.

64. A refractive index pattern preform as claimed in claim 63 having a UV wavelength inducable modulated refractive index Δn level>$10^{-4}$ with a molecular hydrogen level of at least $10^{19}$ $H_2$ molecules/$cm^3$.

65. A refractive index pattern preform as claimed in claim 63, wherein said alkali metal boro-alumino-silicate glass is a melted glass.

* * * * *